United States Patent Office 3,483,154
Patented Dec. 9, 1969

3,483,154
AQUEOUS DISPERSIONS OF RAPIDLY CRYSTALLIZABLE VINYLIDENE HALIDE INTERPOLYMERIZATES
Dale S. Gibbs, Midland, Mich., assignor to The Dow Chemical Company, Midland, Mich., a corporation of Delaware
No Drawing. Filed Oct. 14, 1966, Ser. No. 586,678
Int. Cl. C08f 15/40, 27/00, 1/13
U.S. Cl. 260—29.6                 2 Claims

ABSTRACT OF THE DISCLOSURE

This invention pertains to an improved process for preparing substrates coated with a rapidly crystallizable vinylidene chloride interpolymer. More particularly it relates to the use, as a coating material of interpolymerizates composed essentially of (1) between 80 and 90 weight percent of vinylidene halide, (2) between 8 and 15 weight percent of a vinyl alkanoate having from 3 to 8 carbon atoms in the acid portion, and (3) between 2 and 5 weight percent of a monoethylenically unsaturated comonomer selected from the group consisting of acrylonitrile and a vinyl ester having the structure

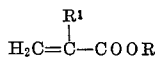

in which $R^1$ is a radical selected from the group consisting of hydrogen or alkyl having from 1 to 3 carbon atoms, and R is alkyl having from 1 to 12 carbon atoms.

---

These aqueous dispersions possess certain unusual properties which make them eminently suitable for the manufacture of protective coatings. These properties include, among others, the inherent ability of the described interpolymerizate to remain essentially non-crystalline for periods of extended storage while in aqueous dispersion, and the further characteristic of rapid crystallization of such interpolymerizate during coalescence of such dispersion to form essentially continuous, non-blocking heat-sealable coatings having excellent moisture-barrier and strength properties.

It has become well known that polymers obtained by the polymerization of vinylidene halides alone or with other polymerizable materials, particularly the normally crystalline vinylidene chloride polymers, are industrially valuable. However, in some instance, the usage of vinylidene chloride polymer latexes as coatings in various applications, particularly those applications requiring high coating speeds, has presented serious problems.

It is recognized by those skilled in the art that coatings produced by the coalescence of polymerized vinylidene chloride from aqueous dispersion are generally characterized by rapid crystallization and subsequent formation of a highly crystalline, non-blocking moisture resistant protective coating. It has been observed, however, that premature crystallization often occurs within such aqueous polymeric dispersion following several days of storing the same under normal conditions of temperature and pressure. Thus, such polymeric dispersions are often difficultly coalesced to form continuous coatings having the desirable properties described herein.

It is additionally known in the art that the rate of crystallization occuring in such polymeric dispersions may be reduced by the interpolymerization of vinylidene chloride with various other monoethylenically unsaturated monomers, which monomers generally have reactivities similar to that of vinylidene chloride. Examples of such monomers include acrylic acid or its ester derivatives, such as methyl acrylate, ethyl acrylate, and methyl methacrylate, and the like. It has been found, however, that such interpolymers are often characterized by a substantially reduced rate of crystallization and degree of ultimate crystallinity with result decreases in moisture-barrier and strength properties following coalescence of the same into coatings and their usefulness is thereby limited, particularly in regard to high speed coating applications.

It is accordingly among the objects of this invention to provide aqueous dispersions of interpolymerizates of vinylidene halides capable of forming a continuous, highly crystalline, essentially non-blocking, heat-sealable, fused coating on cellulosic and various impervious substrates.

It is a further object to provide aqueous dispersions of interpolymerizates of vinylidene halides wherein such aqueous dispersions remain essentially non-crystalline during extended storage thereof.

It is a still further object to provide aqueous dispersions of interpolymerizates of vinylidene halides wherein such interpolymerizates crystallize rapidly during coalescence of the aqueous dispersion to form coatings for cellulosic and various impervious substrates, which coatings have excellent moisture-barrier and strength properties.

Among the vinylidene halides which may be used for the purposes of the present invention are; vinylidene chloride, vinylidene fluoride, vinylidene bromide, vinylidene chlorofluoride, and the like, vinylidene chloride being preferred.

Included within the advantageous definition of vinyl alkanoate may be mentioned, vinyl propionate, vinyl butyrate, vinyl 2-ethyl hexoate, and the like, or suitable mixtures thereof.

Among the vinyl esters advantageously employed in the present invention are; acrylonitrile, methyl acrylate, ethyl acrylate, propyl acrylate, methyl methacrylate, ethyl methacrylate, propyl methacrylate, methyl ethacrylate, ethyl ethacrylate, propyl ethacrylate, and the like and suitable mixtures thereof.

It has further been discovered, which discovery forms a part of the present invention, that the preferred aqueous dispersions contain interpolymerizates having the form of particles, the majority of which are less than about 1200 angstrom units in diameter.

In this regard, it has been found that the use of interpolymerizates of the composition described herein but which are in the form of particles, the majority of which are greater than about 1200 angstrom units in diameter, tend to crystallize more rapidly in aqueous dispersion, and are less stable to the deleterious affects of extended storage. Further, it has been unexpectedly found that interpolymerizates containing the expressed amounts of vinyl acetate as a replacement for the vinyl propionate constituent are also significantly less resistant to undesirable premature crystallization during storage in dispersion form.

The interpolymerizates described herein are prepared by carrying out the polymerization of the mixture of monomers in the desired proportions in aqueous dispersion using methods well known in the art, and preferably by using conventional batch polymerization techniques. The polymerization reaction may be carried out at any desired temperature from about room temperature up to 100° C.; however, best results are generally obtained by employing temperature between about 36° C. and 60° C.

Any of the catalysts commonly used for the polymerization of vinyl compounds may be employed in the preparation of the interpolymerizates of the present invention, such as various peroxygen compounds including potassium persulfate and the like.

A wide variety of dispersing or emulsifying agents may be used, such as the alkyl aryl polyether alcohols;

the alkyl benzene sulfonates and their salts, such as the sodium salt of dodecyl benzene sulfonate; and the salts of alkyl diphenyl oxide disulfonate; and the alkyl esters of sodium sulfosuccinic acids, among many others. Likewise, any suitable material commonly used in the art for controlling the particle size of the polymeric aqueous dispersion may be used in the present invention. As purely exemplary of such commonly used materials are potassium sulfate and sodium chlorate.

In order to obtain products of maximum uniformity, it may be desirable to introduce one or more of the monomeric materials into the reaction mixture gradually during the course of the polymerization. This expedient also facilitates control of the rate of reaction. Although the polymerization may be carried out in the presence of air, the reaction is ordinarily faster in the absence of air.

Usual additives employed in producing aqueous dispersions of interpolymerizates of vinylidene halides may be included herein. Representatives of such additives are pigments, dyes, fillers, and the like employed in the conventional concentrations.

The following example, wherein all parts and percentages are to be taken by weight, illustrates the present invention but is not to be construed as limiting its scope.

EXAMPLE I

In each of a series of experiments a monomeric mixture composed of varying amounts of vinylidene chloride, vinyl propionate, and a vinyl ester individually selected from the group consisting of methyl acrylate, butyl acrylate, and acrylonitrile was dispersed by vigorous agitation in a mixture consisting of 2 weight percent of a 98 percent active sodium salt of dodecyl benzene sulfonate, 0.4 part of potassium persulfate, between 0.4 and 1.2 weight percent sodium chlorate, and amounts of water sufficient to form an aqueous dispersion having a total solids content of about 48 parts by weight. Each of the resulting aqueous dispersions was heated to 50° C. in a closed reactor, capable of withstanding the pressure developed during polymerization of the monomeric mixtures, for a period of about 16 hours, after which the reactor was vented and the polymeric dispersion post-formulated with 1.5 weight per cent of sodium dodecyl diphenyl oxide disulfonate. Each dispersion was then individually heated to a temperature of 70° C., and subsequently cooled to about 25° C. and evacuated for a period of about one-half hour to remove residual monomer.

For comparative purposes, individual polymeric aqueous dispersions were separately prepared in a manner similar to that described herein. In one of such dispersions the polymeric constituent was composed essentially of polyvinylidene chloride. In another of such dispersions the polymeric constituent was a copolymer composed essentially of predominant amounts of vinylidene chloride and minor amounts of vinyl propionate. In yet another dispersion, the polymeric constituent was a terpolymer composed of predominant amounts of vinylidene chloride and minor amounts of ethyl acrylate and acrylonitrile.

The following Table I illustrates the polymeric composition, particle size, and the resistance to crystallization during storage in aqueous dispersion of the interpolymerizates described herein; and the crystallization induction period of films produced from such aqueous dispersions.

TABLE I

| | Composition of interpolymerizate, percent by weight of polymerizable materials | | | | | | Particle size of interpolymerizate, angstrom units | Crystallization induction period, minutes | Time required for initial crystallization in aqueous dispersion, weeks at 25° C. |
|---|---|---|---|---|---|---|---|---|---|
| Run No. | Vinylidene chloride | Vinyl propionate | Methyl acrylate | Ethyl acrylate | Butyl acrylate | Acrylonitrile | | | |
| For comparison: | | | | | | | | | |
| 1 | 90 | 10 | | | | | | 1 | 0.5 |
| 2 | 88 | | | 6.6 | | 5.4 | | 75 | 12 |
| 3 | 89 | 10 | 1 | | | | 1,210 | 1 | 1 |
| 4 | 89 | 10 | | 1 | | | 805 | 1 | 1 |
| 5 | 85 | 14 | | | | 1 | 935 | 1 | 6 |
| This invention: | | | | | | | | | |
| 6 | 87 | 10 | 3 | | | | 1,050 | 1 | 24 |
| 7 | 85 | 13 | 2 | | | | 890 | 1 | 24 |
| 8 | 86 | 10 | | | 4 | | 855 | 1–2 | 28 |
| 9 | 85 | 10 | | | 5 | | 865 | 2 | 28 |
| 10 | 87 | 10 | | | | 3 | 825 | 1–2 | 28 |

The following Table II illustrates the effect of aging upon percent elongation of films produced from the aqueous dispersions as described by the corresponding Run Nos. 3 through 10 of Table I; and the temperature required to heat-seal a coating applied to paper from such dispersions, as well as the effect of aging upon the heat-seal temperatures of such coated paper.

TABLE II

| | Percent elongation of film during aging at 76° F. | | Temperature required to heat-seal coated paper following aging at 76° F. | |
|---|---|---|---|---|
| Run No. | 1 Day | 18 Weeks | 1 Week, ° C. | 18 Weeks, ° C. |
| For comparison: | | | | |
| 3 | (¹) | | 120 | 120 |
| 4 | (¹) | | 120 | 120 |
| 5 | 6 | 1 | 120 | 120 |
| This invention: | | | | |
| 6 | 110 | 38 | 110 | 110 |
| 7 | 100 | 42 | 110 | 110 |
| 8 | 200 | 84 | 110 | 110 |
| 9 | 284 | 374 | 100 | 100 |
| 10 | 106 | 32 | 100 | 100 |

¹ Too brittle to test.

The resistance of the interpolymerizates to crystallization in aqueous dispersion was determined by aging such dispersions for varying time periods at 76° F., followed by coalescence of such dispersions onto individual strips of transparent polystyrene in the form of essentially continuous coatings having a thickness of about 1 mil. Initial effect of crystallization within such dispersion was evidenced by a whitening of the coating formed on the transparent polystyrene film.

The crystallization induction period of coatings produced from such aqueous dispersions was determined as the time required for forming a non-blocking coating on the polystyrene film at a temperature of 60° C. In each of such tests the polystyrene film was individually coated with the aqueous dispersions described herein under a stream of air heated to a temperature of 80° C.

The effect of aging upon the percent elongation of films produced from the aqueous dispersions of the present invention was determined by casting films from such dispersions into glass plates by the method as described herein. The so-formed films were then cut into strips about 0.45 inch wide and 6 inches long and aged for varying time periods at a temperature of 76° F. After aging, the percent elongation of each film was individually determined using procedures well known in the art.

The temperatures required to heat-seal films obtained from the aqueous dispersions of the present invention were determined by individually coating samples of a 51 pound sulfate paper with such dispersions using a No. 6 wire-wound rod. Each of the coated paper samples was subsequently dried in a convection oven operating at 80° C. Each dried coated paper sample was then aged at 76° F. for periods ranging from 1 to 18 weeks and subsequently heat-sealed to determine initially required heat-seal temperatures as well as to detect changes in heat-seal temperatures during aging of the coated paper.

Interpolymerizate particle size was determined by conventional procedures using electron micrographs.

It can be seen from Table I that the interpolymerizates contained in the aqueous dispersions of the present invention remain essentially non-crystalline for a period of many weeks during storage of the dispersion under normal conditions of temperature and pressure, and upon coalescence into films, provide the desirable properties of rapid crystallization to form essentially non-blocking, heat-sealable, fused coatings having excellent flexural properties. Coatings or films produced from these dispersions also are characterized by excellent moisture-barrier properties.

Conversely, aqueous dispersions containing essentially polyvinylidene chloride, or interpolymerizates having the compositions as described by comparative Run Nos. 1, 3, 4, and 5 of Table I, as well as dispersions containing interpolymerizates of the composition as described by Run Nos. 6–10 of Table I but wherein vinyl acetate is used as a replacement for vinyl propionate, have been observed to crystallize noticeably within several days to several weeks of such storage, and are difficultly coalesced to form essentially continuous coatings having the desirable properties as described herein. Additionally, it has been observed that aqueous dispersions containing interpolymerizates of the composition as described by comparative Run No. 2 of Table I, as well as aqueous dispersions containing interpolymerizates of the expressed amounts of vinylidene chloride, and vinyl alkanoate as described by the present invention, but having greater than 5 weight percent of vinyl ester of the structure described herein, require noticeably extended crystallization induction periods when coalesced as protective films or coatings by conventional methods, and are not useful for the purposes of the present invention.

It has further been found that interpolymerizates of vinylidene chloride with various monoethylenically unsaturated monomers which have reactivities similar to that of vinylidene chloride, and which interpolymerizates have the desirable crystallization induction properties described herein, are characterized by noticeably reduced flexural properties and somewhat higher heat-seal temperatures, as compared to the interpolymerizates useful for the purposes of the present invention.

It is to be noted that the combination of desirable and beneficial properties, as described herein, may only be attained by using the expressed amounts of the monomeric constituents of the interpolymerizates contained in the aqueous dispersions of the present invention.

Similar good results, as illustrated and described herein, are obtained using aqueous dispersions of the interpolymerizates composed of (1) between about 80 and 90 weight percent vinylidene chloride, (2) between about 8 and 15 weight percent of a vinyl alkanoate having 3 to 8 carbon atoms in the acid portion, and (3) between 2 and 5 weight percent of a vinyl ester as described herein, wherein the interpolymerizate of the dispersion is in the form of particles, the majority of which are less than about 1200 angstrom units in diameter.

What is claimed is:
1. In the process of preparing colloidally stable aqueous dispersions of vinylidene halide interpolymers which interpolymers crystallize rapidly when cast as protective coatings on various substrates, the improvement consisting of preparing an aqueous dispersion of an interpolymerizate of (1) between 80 and 90 weight percent vinylidene halide; (2) between 8 and 15 weight percent of a vinyl alkanoate having from 3 to 8 carbon atoms in the acid portion, and (3) between 2 and 5 weight percent of a monoethylenically unsaturated comonomer selected from the group consisting of acrylonitrile and a vinyl ester having the structure

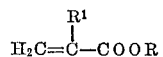

in which $R^1$ is a radical selected from the group consisting of hydrogen and alkyl having from 1 to 3 carbon atoms and R is alkyl having from 1 to 12 carbon atoms; wherein said interpolymerizate is in the form of particles the majority of which are less than about 1200 angstrom units in diameter.

2. The process of claim 1 wherein said vinylidene halide is vinylidene chloride, said vinyl alkanoate is vinyl propionate and said monoethylenically unsaturated comonomer is selected from the group consisting of acrylonitrile, methyl acrylate and butyl acrylate.

References Cited

UNITED STATES PATENTS

| | | | |
|---|---|---|---|
| 2,541,167 | 2/1951 | Pitzl | 260—80.81 |
| 3,092,598 | 6/1963 | Hahn et al. | 260—80.77 |

MURRAY TILLMAN, Primary Examiner

W. J. BRIGGS, Sr., Assistant Examiner

U.S. Cl. X.R.

117—143, 155; 260—80.81